(12) United States Patent
Doi et al.

(10) Patent No.: US 11,466,491 B2
(45) Date of Patent: Oct. 11, 2022

(54) STOPPER MECHANISM FOR TRUNK LID AND A METHOD FOR CONTROLLING ROTATIONAL MOVEMENT OF TRUNK LID

(71) Applicant: Niitech Co., Ltd., Hiroshima Pref. (JP)

(72) Inventors: Masakazu Doi, Saka-cho (JP); Mitsuhiro Kataoka, Saka-cho (JP)

(73) Assignee: Niitech Co., Ltd, Hiroshima Pref. (JP)

( * ) Notice: Subject to any disclaimer, the term of this patent is extended or adjusted under 35 U.S.C. 154(b) by 459 days.

(21) Appl. No.: 16/622,459

(22) PCT Filed: Jun. 19, 2017

(86) PCT No.: PCT/JP2017/022548
§ 371 (c)(1),
(2) Date: Dec. 13, 2019

(87) PCT Pub. No.: WO2018/235131
PCT Pub. Date: Dec. 27, 2018

(65) Prior Publication Data
US 2020/0223491 A1 Jul. 16, 2020

(51) Int. Cl.
*E05D 5/06* (2006.01)
*E05F 1/12* (2006.01)
(Continued)

(52) U.S. Cl.
CPC ............ *E05D 5/062* (2013.01); *E05F 1/1238* (2013.01); *E05F 5/022* (2013.01); *E05F 15/63* (2015.01);
(Continued)

(58) Field of Classification Search
CPC .. E05D 5/062; E05D 2005/067; E05F 1/1238; E05F 5/022
See application file for complete search history.

(56) References Cited

U.S. PATENT DOCUMENTS 2,712,149 A * 7/1955 Harms ................ E05D 11/1085
16/85
2,810,153 A * 10/1957 Semar ................... E05F 1/1238
49/386
(Continued)

FOREIGN PATENT DOCUMENTS

| JP | 2010-254215 A | 11/2010 |
| JP | 2014-047517 A | 3/2014 |
| JP | 2016-101866 A | 6/2016 |

OTHER PUBLICATIONS

International Bureau, Int'l Search Report for PCT/JP2017/22548, dated Dec. 27, 2018, 1 page (translation), Japan Patent Office.

*Primary Examiner* — Jeffrey O'Brien
(74) *Attorney, Agent, or Firm* — Ryder, Mazzeo & Konieczny LLC; Frank A. Mazzeo

(57) ABSTRACT

Trunk lid stopper mechanism and method for controlling rotational speed of a trunk lid to slow down and halt its movement, and to hold the trunk lid at the halted position. The stopper mechanism comprises hinge arms for supporting the lid, torsion bars for applying biasing force to the lid, and link arms for transmitting biasing force from torsion bars to the hinge arms. Either each hinge arm or link arm is equipped with a stopper member that brakes the rotation movement of the trunk lid and halts the trunk lid fully-open. The stopper member has tapered surfaces for reducing relative rotational speed between the hinge and link arms by being forced therebetween during their relative rotational movement, and a stopper surface(s) for abutting against the other arm and halting the arms' relative rotational movement at the fully open position of the trunk lid.

3 Claims, 7 Drawing Sheets

(51) Int. Cl.
  *E05F 5/02* (2006.01)
  *E05F 15/63* (2015.01)
  *B62D 25/12* (2006.01)

(52) U.S. Cl.
  CPC ........ *B62D 25/12* (2013.01); *E05D 2005/067* (2013.01); *E05Y 2900/548* (2013.01)

(56) References Cited

U.S. PATENT DOCUMENTS

| | | | | |
|---|---|---|---|---|
| 2,880,453 | A * | 4/1959 | Gessler | E05D 5/062 248/200 |
| 6,419,293 | B1 * | 7/2002 | Nicholas | E05F 1/1238 296/76 |
| 7,159,685 | B2 * | 1/2007 | Knight-Newbury | B60R 21/38 180/274 |
| 7,815,241 | B2 * | 10/2010 | Renke | E05F 5/06 296/76 |
| 8,251,431 | B2 * | 8/2012 | Nakazato | E05D 5/062 296/76 |
| 8,857,016 | B2 * | 10/2014 | Vantrease | E05D 11/08 16/337 |
| 8,863,359 | B1 * | 10/2014 | Krajenke | E05D 5/062 296/76 |
| 9,115,524 | B1 * | 8/2015 | Sytek | E05F 5/022 |
| 9,476,237 | B2 * | 10/2016 | Sato | E05D 3/02 |
| 10,487,556 | B2 * | 11/2019 | Hyun | E05F 5/022 |
| 2006/0150513 | A1 * | 7/2006 | Kleeh | E05F 5/06 49/340 |
| 2006/0279105 | A1 * | 12/2006 | Renke | E05F 5/06 296/146.11 |
| 2012/0324795 | A1 * | 12/2012 | Krajenke | E05D 11/06 16/221 |
| 2013/0119698 | A1 * | 5/2013 | Patzer | E05D 11/087 296/146.12 |

* cited by examiner

STOPPER MECHANISM FOR TRUNK LID AND A METHOD FOR CONTROLLING ROTATIONAL MOVEMENT OF TRUNK LID

TECHNICAL FIELD

The present invention relates to a stopper mechanism for stopping an opening action of a trunk lid of a vehicle when a trunk lid is operated for opening. More specifically, the present invention relates to a trunk lid stopper mechanism that may stop rotational movement of a trunk lid in a high quality manner by avoiding creation of any unpleasant feeling caused by bounce when it is fully opened, and may prevent unexpected closing movement or vibration of a trunk lid due to strong wind, etc. when it is in a fully open position. The present invention further relates to a method for controlling a trunk lid's rotating movement by utilizing a mechanism as described above.

Background Art

As for a mechanism of opening/closing of a trunk lid, mechanisms such as those shown in FIGS. 4 and 5 are generally known in the prior art (for example, refer to Patent Document 1). With regard to a trunk lid stopper, both a stopper for stopping an opening action and a stopper for stopping a closing action are conceivable. In the present specification, however, a stopper means a stopper for stopping rotational movement of a trunk lid at its fully open position, unless otherwise specified. Stopping a closing action of trunk lid is generally performed by a striker, not shown in the drawings, which is provided for locking a trunk lid in its closed position.

FIG. 4 is a perspective view showing an overview of a trunk lid opening/closing mechanism disclosed in Patent Document 1, and FIG. 5 is a side view of the same when it is seen from a side of a vehicle. Referring to both drawings, trunk lid 2 is fixed to one end of each of a pair of hinge arms 3, which arms are generally formed by bending pipe material having a square configuration in its cross-section, while the other end of each of the pair of hinge arms 3 is connected in a rotatable manner to a hinge bracket 4 provided to a vehicle body 1 (refer to FIG. 5). A pair of torsion bars 5 extend in a body width direction. One end of each of the torsion bars 5 is hooked to one of the hinge arms 3, respectively, while another end of each of the torsion bars 5 is fixed to the hinge bracket located at an opposite side of the body width direction. By means of such arrangement, when the trunk lid 2 is in a closed position, the torsion bars are twisted; hence, they always exert biasing force against trunk lid 2 with their elasticity.

When the striker holding the trunk lid 2 in its closed position is released, the trunk lid 2 is lifted and rotated vigorously toward an opening position by means of the biasing force of torsion bars 5, and then the rotational movement of the trunk lid 2 is stopped when a stopper 9 abuts against a beam 8 provided to the body as shown in FIG. 5. In this particular moment, in order for diminishing impact created at the time when the hinge arms 3 abut against the body, elastic holding members 6 are provided to the beam side and engaging members 7 are provided to the hinge arms 3 (refer to FIG. 5), both of which perform impact absorbing effects, according to Patent Document 1.

Another mechanism such as shown in FIG. 6 is also known in the prior art in trunk lid opening/closing technology. FIG. 6 is a side view similar to FIG. 5 from side of a body, in which torsion bars 5 are not directly hooked to hinge arms 3, but rather a link arm 11 is provided between each torsion bar 5 and hinge arm 3. One end of each torsion bar 5 is inserted in a groove formed to one end of the link arm 11 so as to exert biasing force to the link arm 11, and a bifurcated other end of the link arm 11 is connected in an interposing manner to each hinge arm 3 in a rotatable manner so as to transmit such biasing force of the torsion bar 5 to the hinge arm 3. By structuring the link mechanism in such a manner, when the biasing force of the torsion bar 5 rotates the hinge arm 3 as shown by dotted lines in the drawing, the interconnecting angle between the link arm 11 and the hinge arm 3 gradually changes to a more acute angle as the trunk lid approaches toward its fully open position, which may decrease the torque for rotating the hinge arm 3 and may lead to make a biasing force of the torsion bar 5 against the trunk lid in a proper level depending on the angle of closing. In addition, a squeaking sound created by direct connection and sliding action between the torsion bar 5 and the hinge arm 3 may be prevented.

In other mechanisms known in the prior art as shown in FIG. 7, sliding structure 50 comprising a slider 51 and sliding rail 52 is provided at a position where the hinge arm 3 and torsion bar 5 contact each other. In such an arrangement, relative movement between the hinge arm 3 and the torsion bar 5 created by a gap between rotational centers "Ch" of hinge arm and "Ct" of torsion bar 5 may be absorbed by a sliding action of the sliding structure 50. By properly setting relative positions between the hinge arm 3 and the torsion bar 5, and by properly selecting a frictional force of the sliding structure 50, it is intended to properly control the opening/closing action of trunk lid 2, including controlling rotational speed of trunk lid 2 during its closing action (for example, refer to Patent Document 2).

CITATION LIST

Patent Documents

Patent Document 1: Japanese Patent Application Publication No. 2016-101866. Patent Document 2: Japanese Patent Application Publication No. 2014-047517.

SUMMARY OF INVENTION

Technical Problems

Each of the above mentioned prior art trunk lid stopper mechanisms had some technical problems. According to the stopper 9 shown in FIGS. 4 and 5, bounce of the trunk lid may be avoided to a certain extent by providing an elastic absorbing structure comprising elastic holding member 6 and contacting member 7, both of which are designed to have proper configuration. However, unpleasant impact sound or impact vibration may not be avoided since a rotational speed of the trunk lid is not controlled anyway, and bounce-absorbing capability by the stopper 9 against which the impact directly hit is limited.

According to the mechanism shown in FIG. 6, even if a rotational speed of the trunk lid is controlled to a certain extent, since there are no significant differences compared to the other means in terms of stopping rotational movement by abutting the stopper 9 against a body member, it should be difficult to avoid impact sound and impact vibration even if somewhat, improvement may be achieved.

According to the structure shown in FIG. 7, even if a certain level of effect may be achieved by arranging a relative position between link arm 3 and torsion bar 5, or by setting a frictional force of the sliding mechanism at a proper level, such structure may not be sufficient enough for a required level of stopper function. Further, even if impact sound, etc. may be avoided by controlling opening/closing actions, such a structure is extremely complicated as is apparent from FIG. 7, and is disadvantageous because of the number of components, production complications, cost effectiveness, as well as adjustment efforts required for such a complicated structure.

Based on the above, the purpose of the present invention is to solve the above-mentioned problems known in the prior art with regard to the stopper mechanism for stopping rotational movement of the trunk lid, and to provide a novel trunk lid stopper mechanism that may cleverly control rotational speed of the trunk lid when it is operated toward an open position by slowing down rotational speed of the trunk lid and halting the same in a high quality manner with a simple structure, and to provide a method for controlling rotational movement of the trunk lid.

Measures for Solving the Problems

The present invention is to solve the above-mentioned problems known in the prior art with regard to a trunk lid stopper mechanism having a link arm for transmitting biasing force created by a torsion bar to the hinge arm, by providing a unique stopper structure between the link arm and the hinge arm which may properly control rotational speed of the trunk lid and halt the same. More specifically, the present invention includes the following contents.

One aspect of the present invention relates to a trunk lid stopper mechanism for stopping an opening action of a trunk lid of a vehicle at its fully open position without bounce, comprising:

hinge arms for supporting a opening/closing action of the trunk lid, one end of each of which is fixed to the trunk lid and other end of the same is rotatably connected to a hinge bracket provided to a vehicle body, torsion bars for exerting biasing force necessary for opening the trunk lid, and link arms, each of which having bifurcated parts at one end for interposing the hinge arm for transmitting the biasing force created by the torsion bars to the hinge arm, which biasing force is received at the other end of each link arm, characterized in that either each of the hinge arms or the link arms is provided with a stopper member for imposing a braking force to the trunk lid rotational movement and for stopping the same at a fully open position of the trunk lid, and that said stopper member is provided with one or more tapered surfaces for imposing a braking force to relative rotation between the hinge arm and the link arm by being forced into the gap therebetween when the trunk lid is rotated toward its fully open position, and with a stopper surface(s) for stopping relative rotation between the hinge arm and the link arm by abutting to the other arm when the trunk lid reaches at its fully open position.

The above-mentioned stopper member may be attached to the pair of the bifurcated parts of the link arm. In this case, the tapered surfaces may be located between the pair of bifurcated parts, both of which are facing each other, and the stopper surface may be located at a central portion of the stopper member which connects the pair of bifurcated parts.

The above-mentioned stopper member may be attached to an outer surface of the hinge arm. In this case, the tapered surfaces may be provided to side surfaces of the stopper member, which are to be faced to the pair of the bifurcated parts when the hinge arm is forced into the gap of the pair of bifurcated parts, and the stopper surfaces may be provided to thicker areas of the stopper member, which are formed by having a step relative to the tapered surfaces.

Another aspect of the present invention relates to a method for controlling rotational movement of a trunk lid configured to slow down rotational speed of the trunk lid during opening action of the trunk lid of a vehicle so as to stop rotational movement of the trunk lid without causing a bounce at its fully open position. The method is characterized in that:

tapered surfaces for reducing speed of relative rotation between hinge arms and link arms are provided to at least either a pair of bifurcated parts formed at one end of each link arm, or side surfaces of each hinge arm facing the pair of bifurcated parts, which bifurcated parts are configured to transmit biasing force created by torsion bars to the hinge arms by rotatably interposing side surfaces of the hinge arms fixed to the trunk lid, and that the method includes braking the rotational movement of the trunk lid when the trunk lid approaches its fully open position by forcing the tapered surfaces into a gap between the pair of bifurcated parts and sides of the hinge arm.

Yet another aspect of the present invention relates to a method for controlling rotational movement of a trunk lid so as to stop the rotational movement of the trunk lid at its fully open position. The method is characterized in that a stopper surface(s) is provided to either at least each hinge arm, one end of which is rotatably supported by a bracket provided to a vehicle body and the other end of which is fixed to a trunk lid so as to support the trunk lid during an opening/closing action, or each link arm, one end of which is connected to a torsion bar and the other end of which is rotatably connected to the hinge arm so that biasing force created by the torsion bar may be transmitted to the hinge arm, and that the method comprises stopping the trunk lid at its fully open position by abutting either the hinge arm or the link arm against the stopper surface(s) provided on the other arm.

Advantageous Effects of the Present Invention

By implementing the present invention, technical effects may be achieved such as: rotational speed of the trunk lid during opening operation may be properly controlled, impact sound may be eliminated by reducing rotational speed of the trunk lid, and the trunk lid is safely held at its fully open position by means of a simple and low-cost stopper mechanism.

EMBODIMENTS OF THE PRESENT INVENTION

Figure 1A:
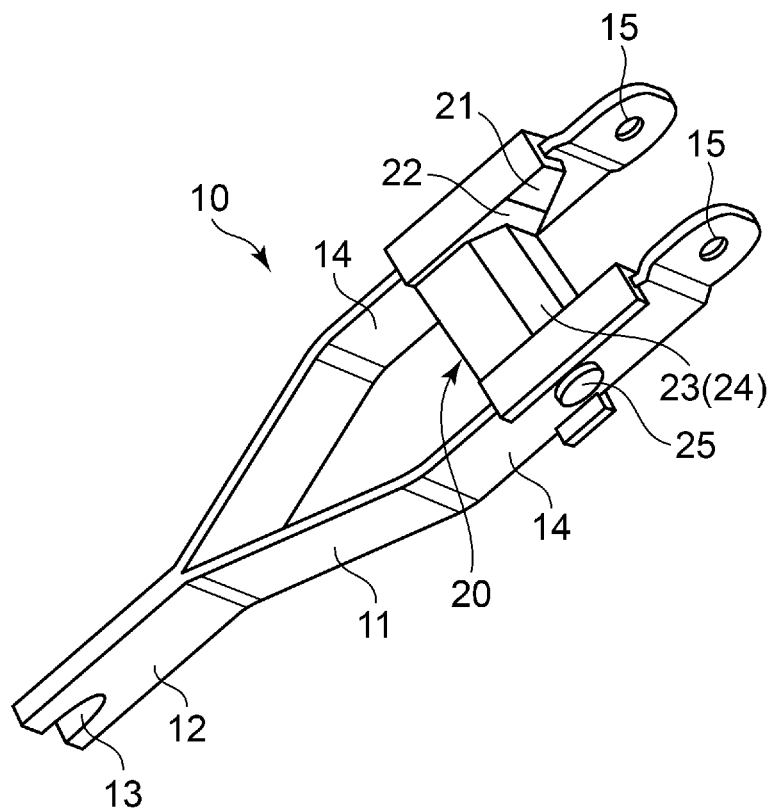
FIG. 1 A perspective view (a) and a front view (b), both showing a link arm structure having the stopper mechanism according one embodiment of the present invention.

A trunk lid stopper mechanism according to one embodiment of the present invention is now described by referring to appended drawings. The trunk lid stopper mechanism according to the present invention is directed to a mechanism that includes a link arm as known in prior an, such as the one shown in FIG. 6. FIG. 1(a) is a perspective view of a link arm 10 that can be used for a trunk lid stopper mechanism according to the present embodiment. Referring to FIG. 1(a), the link arm 10 comprises a link arm main part 11 (which corresponds to the prior art link arm 11 shown in FIG. 6), a stopper member 20, and a fixing pin 25 for fixing the stopper member 20 to the link arm main part 11.

Figure 6:
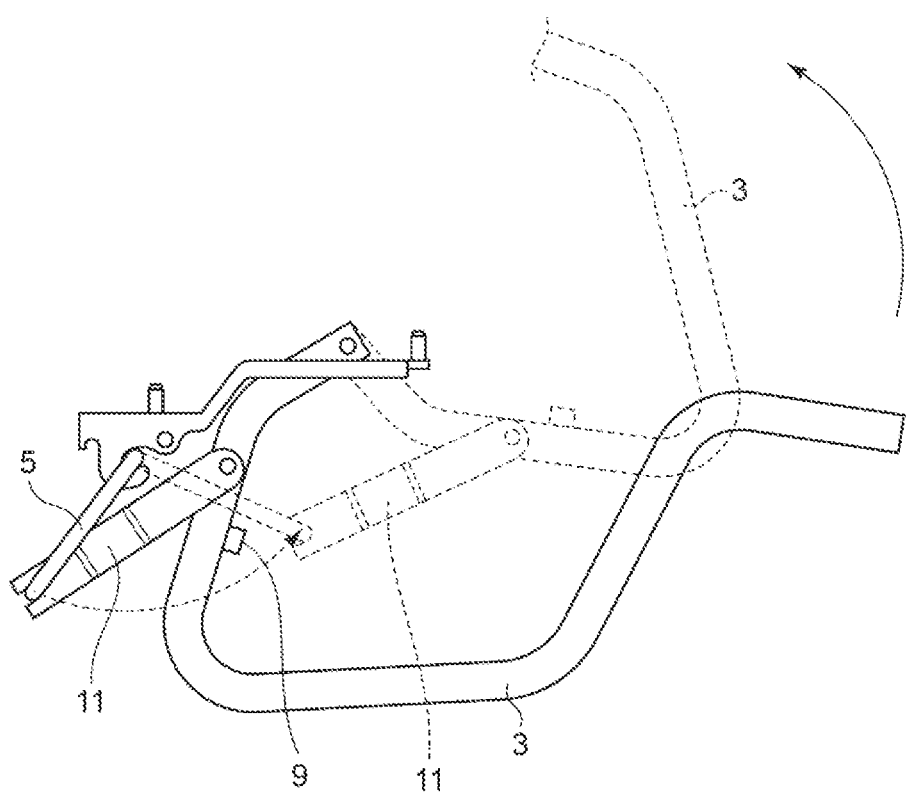
FIG. 6 A side view showing an overview of a trunk lid opening/closing mechanism according to prior art.
Figure 7:
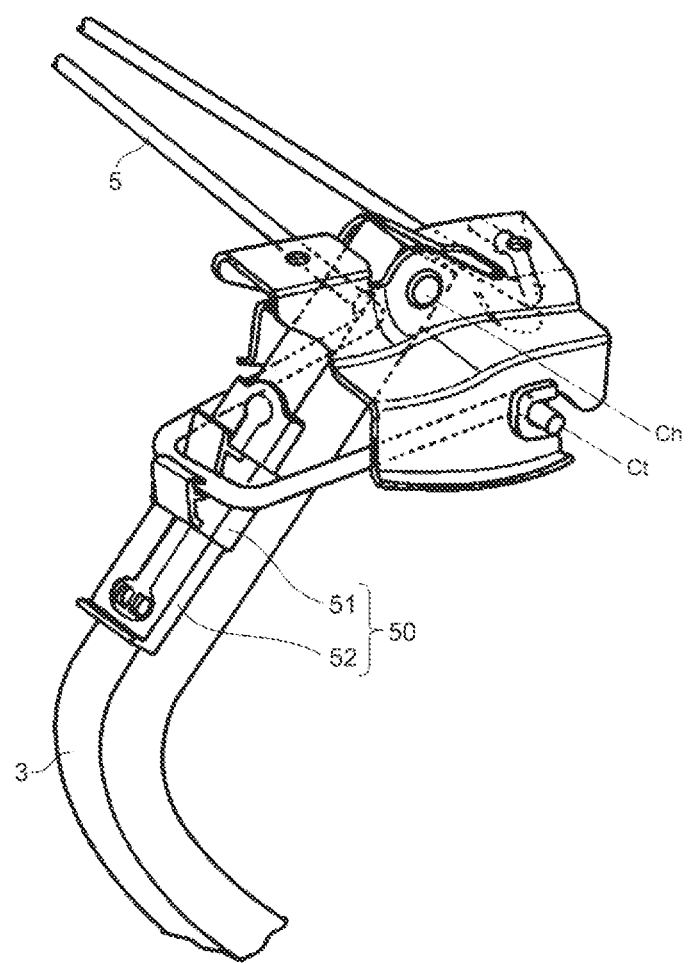
FIG. 7 A perspective view showing an overview of another trunk lid opening/closing mechanism according to prior art.

Link arm main part 11 is basically similar to the link arm 11 shown in FIG. 6; namely, a groove 13 for holding a torsion bar 5 is provided to one end of a base 12 shown in the lower side of the drawing, a pair of bifurcated parts 14 are provided to the other end thereof for interposing the hinge arm 3 to be located on the upper side of the drawing (not shown in the drawing, refer to FIG. 6), and connecting hole 15 is provided to each of the bifurcated parts 14 for connecting hinge arm 3 in a rotatable manner. Positioning and action of these hinge arm 3, torsion bar 5, and link arm main part 11 are similar to the above description made by referring to FIG. 6.

The stopper member 20 of the present embodiment is provided in such a manner that it straddles over a pair of bifurcated parts 14 of the link arm main part 11, and a tapered surface 21 and straight surface 22 are formed at each inner side of the stopper member 20 extending along the bifurcated part 14 in this order from an open end of the bifurcated part 14. At a central portion of the stopper member 20, which connects both bifurcated parts 14, stopper surfaces 23 and 24 (24 is hidden behind the drawing) are provided, which are formed as slant surfaces inclined in a direction from bifurcated part 14 to base 12. Material of the stopper member 20 is desirably rubber or plastics having proper elasticity, and EPDM (ethylene propylene diene rubber) is used for the present embodiment.

Figure 1B:
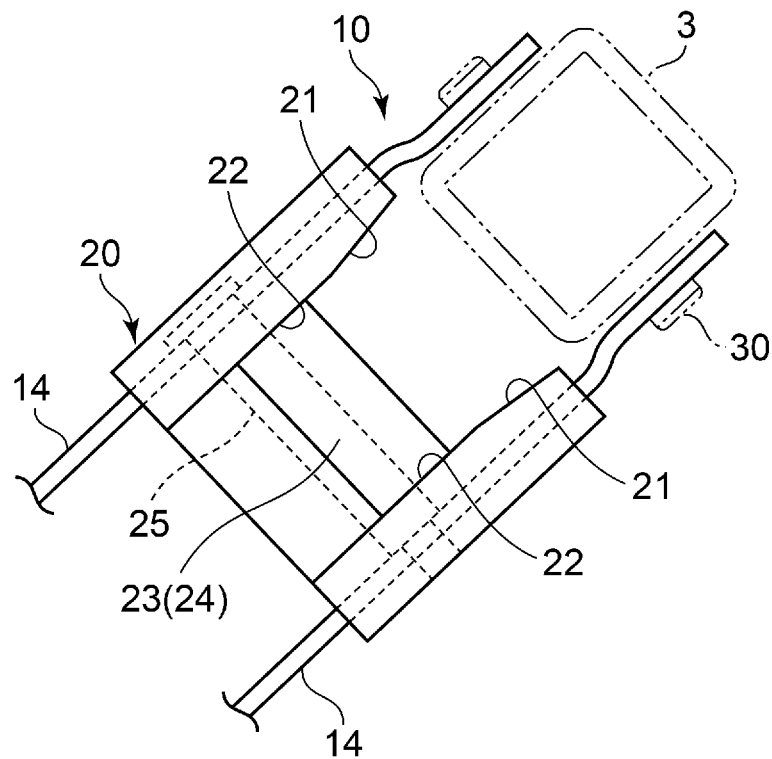

FIG. 1(b) is a front view of the link arm 10, the same arm as shown in FIG. 1(a), but viewing in a longitudinal direction of the hinge arm 3 (cross-sectional view of the hinge arm 3 is shown by two-dot chain line in the drawing in which the arm is a square pipe configuration) connected to the link arm 10. Referring to the drawing, the tapered surfaces 21 are formed as inclined surfaces slightly expanding relative to each other in a direction toward the hinge arm 3, which surfaces are followed by straight surfaces 22 formed in a parallel condition. The hinge arm 3, which is interposed between a pair of the bifurcated parts 14, is connected to the link arm 10 in a rotatable manner around a connecting pin 30. When the trunk lid is operated for opening, hinge arm 3 and link arm 10 rotate relative to each other, during which outer surface of the hinge arm 3 is interposed between a pair of tapered surfaces 21 of the stopper member 20 and gradually pushed forward therebetween. Subsequently, the hinge arm 3 is further pushed forward and finally it abuts against the stopper surface 23, which stops rotational movement of the hinge arm 3. In case the hinge arm 3 rotates in the opposite direction for closing, it abuts against another stopper surface 24, which stops rotational movement of the same. In reality, since rotational movement of the trunk lid when it is operated for closing is stopped by a striker, which catches the trunk lid and locks the same, such function of the other stopper surface 24 may not necessarily be required, but rather it may be formed as a flank for avoiding interference with the hinge arm 3. Such movement would be further discussed later by referring to FIG. 2.

Basic specifications of the stopper structure having the link arm 10 according to the present embodiment are as follows. Hinge arm 3 is made from a hollow bar having a square cross-section, each side surface of which has a width of 24 mm, and each corner is rounded (curved surface). A gap between a pair of bifurcated parts 14 for interposing the hinge arm 3 is 26 mm. The gap between a pair of tapered surfaces 21 at their open end is 24 mm, which corresponds to width of the hinge arm 3 when the arm is to be forced into the gap. Span of the gap gradually decreases from the open end toward the base, and at its final stage, it is designed to have overlap of 0.5 mm at one side relative to the hinge arm 3 (23 mm). Therefore, the gap between a pair of the straight surfaces 22 is 23 mm. Angle of inclination of the tapered surface 21 may be determined depending on required level of rotational speed reduction of the hinge arm 3, but it may be in a range from 2 degrees to 10 degrees. The angle in the present embodiment is set at 3 degrees.

Action of the trunk lid stopper having the link arm 10 as described above is basically similar to that of the prior art link arm as described before by referring to FIG. 6. That means, the link arm 10 (reference number in FIG. 6 is 11) biased by the torsion bar 5 at its one end is pushed along the circular arrow shown by a dotted line in FIG. 6 when a striker, not shown in the drawing, is released, which leads to push and rotate the hinge arm 3 rotatably connected to the other end thereof, and the trunk lid is lifted up to fully open position. During such action, the link arm 10 (11) moves relative to the vehicle body, and simultaneously the link arm 10 (11) and the hinge arm 3 rotate relative to each other. Such relative rotation is further described hereinafter by referring to FIG. 2.

Figure 2:
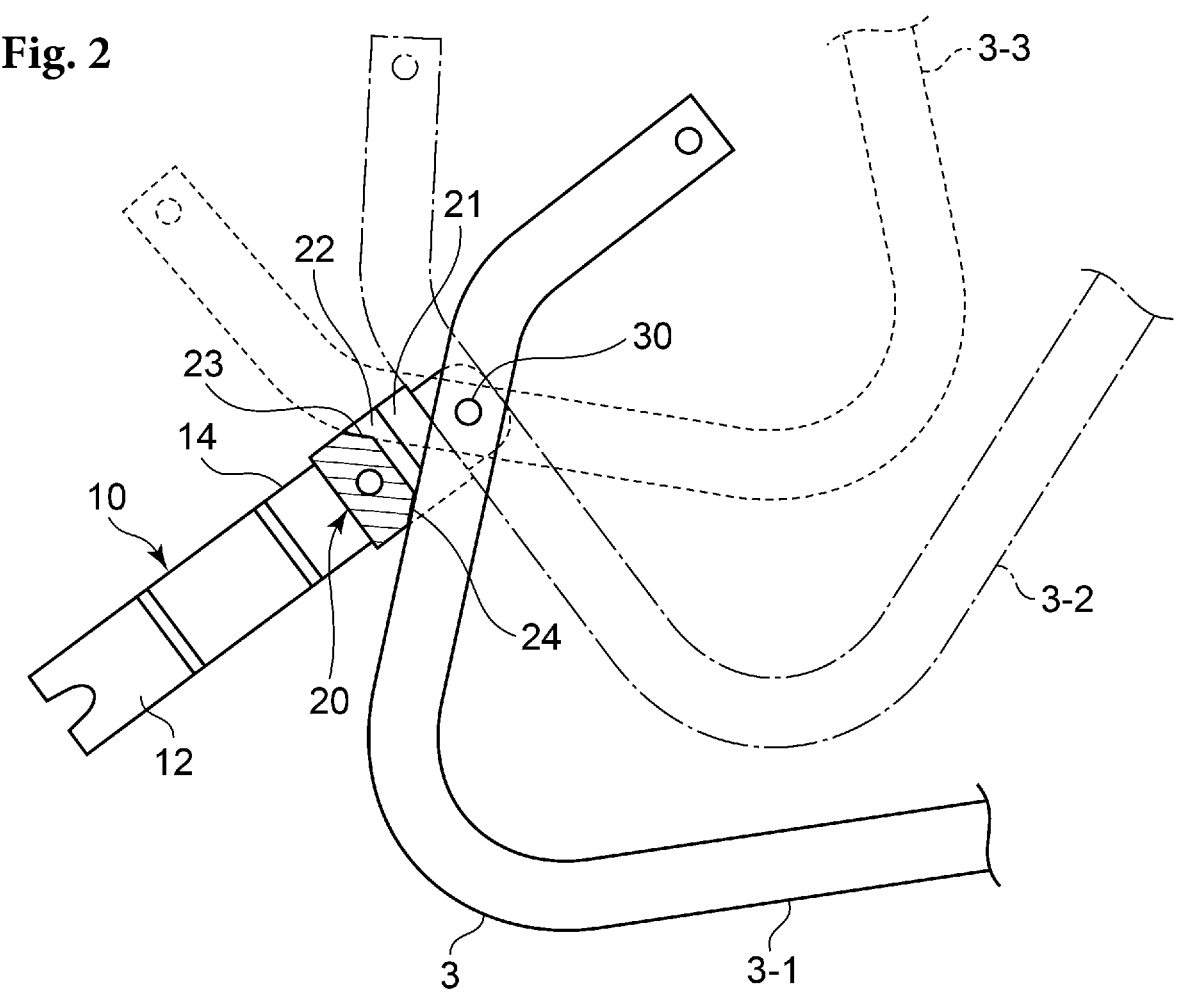
FIG. 2 A side view showing action of the stopper mechanism when a link arm shown in FIG. 1 is operated.

In FIG. 2, action of the hinge arm 3 which rotates relative to the link arm 10 around the connection pin 30 is shown under the assumption that the link arm 10 is as if fixed. In FIG. 2, one half of the link arm 10 at the fore side of the drawing is cut out, therefore bifurcated part 14 shown in the drawing is the other half that is located on the distant side. Further, stopper member 20 connecting both bifurcated parts 14 is cut at its center, and is shown in the drawing in a cross-sectional view having hatching lines. In this cross-section, both stopper surfaces 23 (to be used when the lid is open) and 24 (to be used when the lid is closed) can be seen at the upper left hand side and lower right hand side of the stopper member 20, respectively.

When the hinge arm 3 is held at the position shown by the solid line 3-1, the trunk lid is in its closed position. At this position, one surface of the hinge arm 3 rests against the stopper surface 24 of the stopper member 20, and the arm is halted. However, as described above, since the trunk lid is caught by the striker and is locked at its stop position, the stopper surface 24 may be formed in the condition that would not interfere with the hinge arm 3.

Next, when the striker is released and the link arm 10 is pushed forward by a biasing force of the torsion bar 5 (not shown in the drawing), which causes rotational movement of the trunk lid toward its open position, the hinge arm 3 relatively rotates counterclockwise toward the position shown by one-dot chain line 3-2 in the drawing. At this position, the hinge arm 3, which could freely rotate until this position, starts to move into a gap between a pair of tapered surfaces 21 of the stopper member 20, and frictional force for controlling rotational action starts to be effected. When the hinge arm 3 further moves forward, the frictional force gradually increases since the gap between the pair of tapered surfaces 21 becomes narrower, and rotational speed is gradually reduced. Area of contacting surfaces between the hinge arm 3 and the tapered surfaces 21 gradually increases, which may further enhance rotational speed reduction. Opening angle of the trunk lid 2 at the position shown by one-dot chain line 3-2 is about 57 degrees.

When the trunk lid is further rotated, the hinge arm 3 also rotates further to a position shown by a dotted line 3-3. At this position, one surface of the hinge arm 3 abuts against the stopper surface 23 located at a central portion of the stopper member 20, which stops rotation of the hinge arm 3, as well as stops the opening action of the trunk lid 2 at its fully open position. Opening angle of the trunk lid at this position is about 95 degrees. Just before the trunk lid reaches this position, the hinge arm 3 is forced into a gap between a pair of tapered surfaces 21 first and then into a gap between a pair of straight surfaces 22, which enhance the rotational speed reducing effect for braking rotational movement of the trunk lid. By the time the hinge arm 3 abuts against the stopper surface 23, inertia of trunk lid rotation is diminished, which avoids creation of bounce and impact noise. Since stopper surface 23 is made from soft material, it has excellent sound-absorbing capability. Further, since the hinge arm 3 at the stopped position is held tightly in the gap between a pair of straight surfaces 22, vibration or unexpected closing action of the trunk lid 2 due to wind effect, etc. may advantageously be avoided.

Operating the trunk lid from its fully open position to fully closed position is easy. That is, when a user exerts operating force for closing the trunk lid, restraint force for holding the hinge arm 3 by the stopper member 20 may easily be released, and the user may only push the trunk lid downward to provide proper rotational momentum for making the striker catch the trunk lid.

It is conceivable that the trunk lid stopper mechanism according to the present embodiment as described above may have some room for modification. As an example relating to FIG. 1, instead of providing both tapered surface 21 and straight surface 22, providing only tapered surface 21 and eliminating the straight surface may be possible. Another example is that instead of providing an inflection line between the tapered surface 21 and the straight surface 22, providing a smooth line connecting both surfaces such as a form in arch configuration could be possible.

Figure 3:
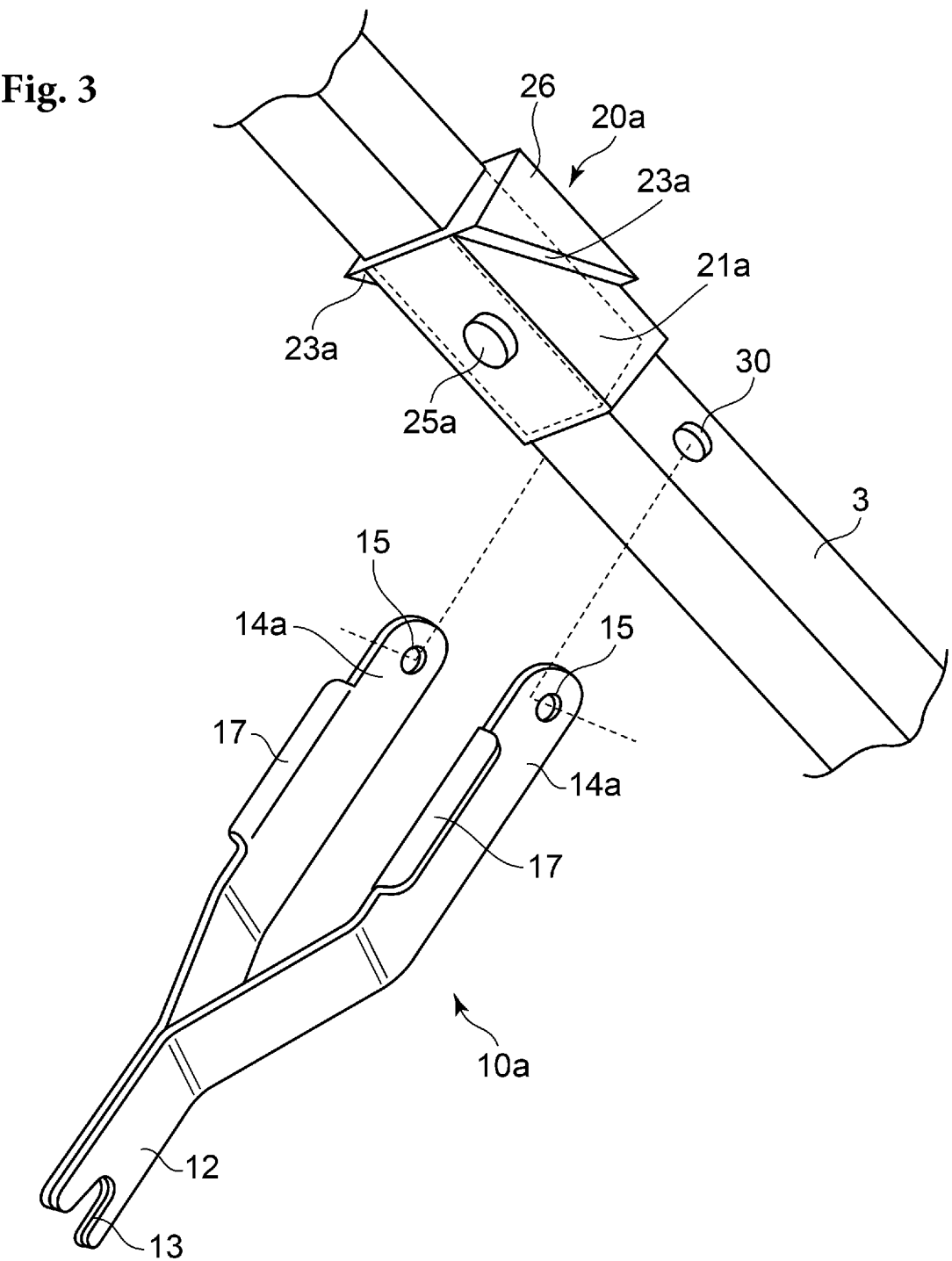
FIG. 3 A perspective view showing overview of a stopper mechanism according another embodiment of the present invention.
Figure 4:
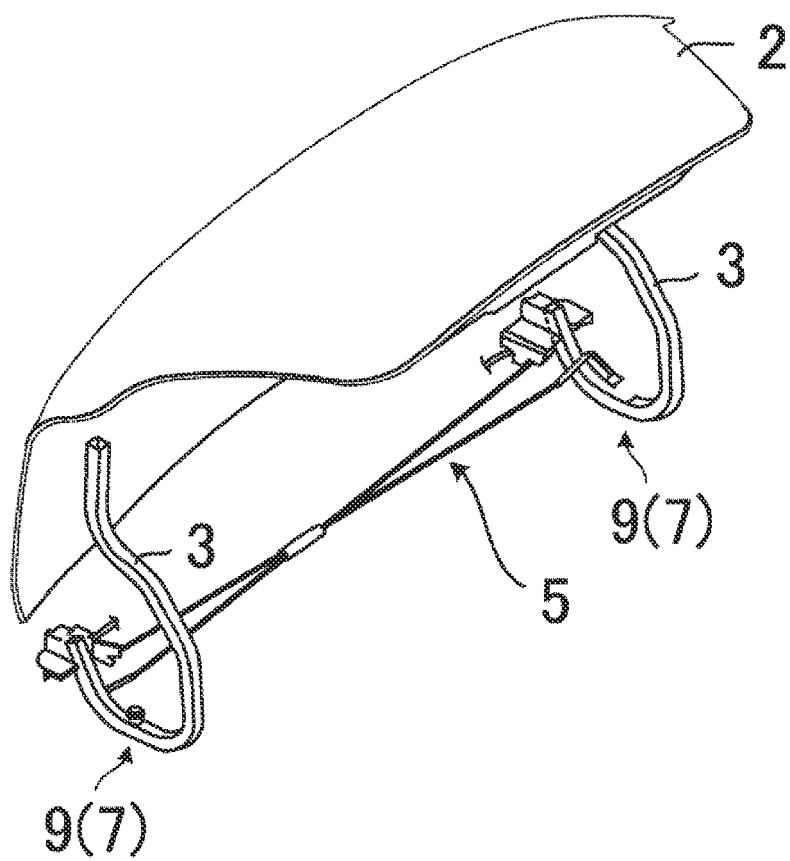
FIG. 4 A perspective view showing structural elements of a trunk lid opening/closing mechanism according to prior art.
Figure 5:
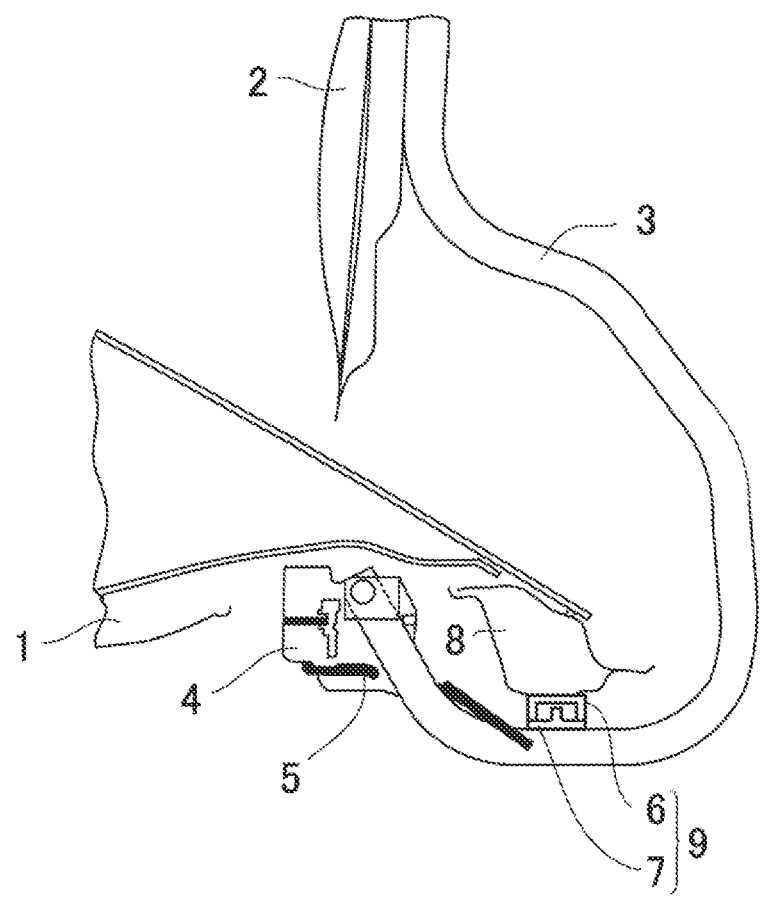
FIG. 5 A side view of the trunk lid opening/closing mechanism shown in FIG. 4.

Next, the trunk lid stopper mechanism according to the second embodiment of the present invention will now be described. FIG. 3 shows the trunk lid stopper mechanism according to the present embodiment, in which the stopper member is not provided to the link arm 10 as in the case of the previous embodiment, but rather it is provided to the hinge arm 3. Referring to FIG. 3, hinge arm 3 is covered by a stopper member 20a (hereinafter, reference numerals for the like elements as shown in FIGS. 1 and 2 have suffix 'a' to the same reference numerals) in a U shape or a headband shape, which is fixed to the hinge arm 3 by a fixing pin 25a. Such a way of fixing is just an example, and some other fixing way may be employed, such as fixing it from both sides (right-hand side and left-hand side in the drawing) in a manner interposing the hinge arm 3 by a separated fixing member, or fixing it from both sides in a longitudinal direction interposing the hinge arm by a separated fixing member, or by gluing it to the hinge arm 3.

The stopper member 20a according to the present embodiment is provided with a tapered surface 21a to each side thereof as shown in the drawing. The tapered surfaces 21a are to be forced into the gap between bifurcated parts 14a of link arm 10a, which would perform a braking function against rotational movement of the hinge arm 3. This will be described later. The stopper member 20a is further provided with thicker areas 26, each of which has an inclined stopper surface 23a at a lower end thereof in the drawing facing the link arm 10a.

The link arm 10a for transmitting biasing force to the hinge arm 3 is shown in the lower side of FIG. 3. The link arm 10a may basically be similar to the prior art link arm 11 shown in FIG. 6, but it would be desirable to incorporate a slight change. The stopper member 20a attached to the hinge arm 3 would be forced into a gap between the pair of bifurcated parts 14a of the link arm 10a as the trunk lid rotates toward fully open position. During such operation, if a fracture surface created by a stamping operation remains at an edge of an end surface of the bifurcated parts 14a, the tapered surface 21a of the stopper member 20a made from soft material would suffer from scratching damage when it is forced into the gap of the bifurcated parts 14, which may cause a durability problem. To eliminate such damage, it is desirable to form rounded corners at the end surface of the bifurcated parts 14 facing the hinge arm 3 by hemming process, or to add a bending portion 17 as shown in the drawing so as to make forcing operation smooth. Such bending portion 17 may also work as a stopper seat by contacting the stopper surface 23a of the stopper member 20a when the trunk lid is fully opened. However, such stopper seat may not necessarily be required, since the stopper surface 23a would anyway abut against end surfaces of the bifurcated parts 14.

Action of the trunk lid stopper mechanism according to the present embodiment as structured above is similar to that of the trunk lid stopper mechanism according to the previous embodiment as described by referring to FIGS. 1 and 2. Specifically, by referring to FIG. 2, during the time hinge arm 3 rotates from a trunk lid closed position shown by solid line 3-1 and reaches to half-way opening position shown by one-dot chain line 3-1, the stopper member 20a starts to be forced into the gap of the pair of bifurcated parts 14, upon which rotational action is gradually restricted and finally when it reaches the position shown by dotted line 3-3, the stopper surfaces 23a of the stopper member 20a abut against either end surfaces of the bifurcated parts 14 or the bending portions 17, and rotational movement of the trunk lid is halted. At this moment, since rotational movement is interfered beforehand due to braking effect by the tapered surfaces 21a, and since the stopper surfaces 23a are made from soft material, unpleasant sound due to impact would be avoided. Further, since relative movement between the hinge arm 3 and the link arm 10a is restricted at the tapered surfaces 21a, an unexpected closing action of the trunk lid due to wind, etc. would be avoided.

A variety of modifications to the present embodiment may also be conceivable just like in the case of the previous embodiment. As an example, each side of the stopper member 20a may be provided with a straight surface (which corresponds to a portion having reference numeral 22 in FIGS. 1 and 2) in addition to the tapered surface 21a. In such a case, instead of forming an inflection line between these two surfaces, providing a smooth line for connecting both surfaces such as a form in arch configuration could be possible. Further, by combining the previous embodiment and the present embodiment, it could be possible to provide tapered surface 21 (21a) to either one of the hinge arm 3 and link arm 10 (10a) for reducing rotational speed, and to provide stopper surface 23 (23a) to either one of the other arm for stopping the rotational movement.

The trunk lid stopper mechanism according to each of the embodiments of the present invention has been explained so far, but the present invention further includes a method for controlling rotational movement of the trunk lid by utilizing the stopper mechanism described in the fore-mentioned embodiments. The method has two folds, one of which is to provide a tapered surface to either hinge arm or link arm that relatively move during trunk lid opening/closing action, and to control rotational movement of the trunk lid by using resistance created by forcing tapered surfaces into a gap of the other arm during such rotational movement. Second fold is to control rotational movement of the trunk lid by stopping relative movement between the hinge arm and the link arm when the trunk lid is in its fully open position by providing a stopper surface to either one of the hinge arm and the link arm and abutting the other arm against such stopper surface. Specific means to perform such methods are already described in the above-mentioned embodiments.

INDUSTRIAL APPLICABILITY

10044 The trunk lid stopper mechanism, as well as a method for controlling rotational movement of a trunk lid, according to the present invention may widely be used in industrial fields such as producing, selling, and utilizing a vehicle having a trunk lid.

EXPLANATION OF REFERENCE NUMERALS 1. body, 2. trunk lid, 3. hinge arm, 4. hinge bracket, 5. torsion bar, 10, 10a. link arm, 11. link arm main part, 12, 13. groove, 14, 14a. bifurcated part 15. connecting hole, 20, 20a. stopper member, 21, 21a. tapered surface, 22. straight surface, 23, 23a. stopper surface, 25, 25a. fixing pin, 26. thicker area, 30. connecting pin

What is claimed is:

1. A trunk lid stopper mechanism for stopping an opening action of a trunk lid of a vehicle at its fully open position without bounce, comprising:
    a hinge arm for supporting opening and closing action of the trunk lid, a first end of the hinge arm is fixed to the trunk lid and a second end of the hinge arm is rotatably connected to a hinge bracket provided to a vehicle body,
    torsion bars for exerting biasing force necessary for opening the trunk lid, and
    a link arm having bifurcated parts at a first end for interposing the hinge arm for transmitting the biasing force created by the torsion bars to the hinge arm, said biasing force is received at a second end of the link arm,
    the hinge arm is provided with a stopper member for imposing a braking force to trunk lid rotational movement and for stopping the trunk lid at the fully open position of the trunk lid, and
    the stopper member is provided with tapered surfaces for imposing a braking force to relative rotation between the hinge arm and the link arm by being forced into a gap between the bifurcated parts of the link arm when the trunk lid is rotated toward the fully open position, and with a stopper surface for stopping relative rotation between the hinge arm and the link arm by abutting to the link arm when the trunk lid reaches the fully open position.

2. The trunk lid stopper mechanism as described in claim 1, characterized in that the stopper member is attached to an outer surface of the hinge arm, the tapered surfaces are provided to side surfaces of the stopper member which face the pair of the bifurcated parts when the hinge arm is forced into the gap of the pair of bifurcated parts, and the stopper is provided to an area of the stopper member that is wider than the taper surfaces, which is formed by having a step relative to the tapered surfaces.

3. A method for controlling rotational movement of a trunk lid configured to slow down rotational speed of the trunk lid during opening action of the trunk lid of a vehicle so as to stop rotational movement of the trunk lid without causing a bounce at its fully open position, comprising:
    providing a trunk lid stopper mechanism comprising:
        a hinge arm for supporting opening and closing action of the trunk lid, a first end of the hinge arm is fixed to the trunk lid and a second end of the hinge arm is rotatably connected to a hinge bracket provided to a vehicle body,
        torsion bars for exerting biasing force necessary for opening the trunk lid, and
        a link arm having bifurcated parts at a first end for interposing the hinge arm for transmitting the biasing force created by the torsion bars to the hinge arm, said biasing force is received at a second end of the link arm,
    the hinge arm is provided with a stopper member that imposes a braking force to trunk lid rotational movement and stops the trunk lid at the fully open position of the trunk lid, and
    the stopper member is provided with tapered surfaces that impose a braking force to relative rotation between the hinge arm and the link arm by being forced into a gap between the bifurcated parts of the link arm when the trunk lid is rotated toward the fully open position, and is provided with a stopper surface that stops relative rotation between the hinge arm and the link arm by abutting to the link arm when the trunk lid reaches the fully open position.

* * * * *